Oct. 15, 1946.    C. P. FELDHAUSEN    2,409,264
MOTOR CONTROLLER
Filed Aug. 17, 1944    2 Sheets-Sheet 1

Inventor
Cyril P. Feldhausen
By
Attorney

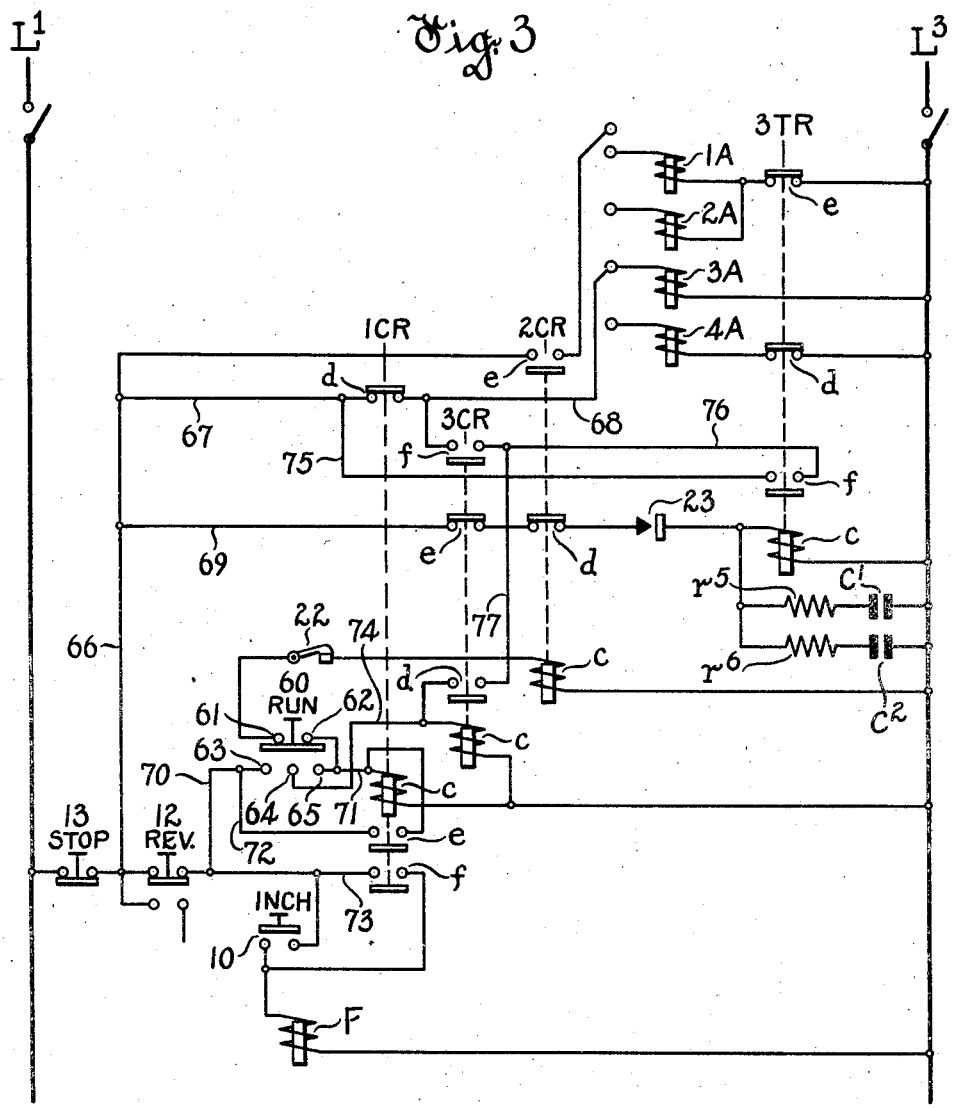

Patented Oct. 15, 1946

2,409,264

UNITED STATES PATENT OFFICE 2,409,264

MOTOR CONTROLLER

Cyril P. Feldhausen, Wauwatosa, Wis., assignor to Cutler-Hammer, Inc., Milwaukee, Wis., a corporation of Delaware Application August 17, 1944, Serial No. 549,855

16 Claims. (Cl. 172—179)

This invention relates to improvements in motor controllers.

More particularly the invention is especially applicable to controllers for graphic art machinery such as flat bed presses, cutters and creasers, folders and platen presses, and other machinery where high torque is required for starting and where it is desired to inch at slow speed, to run at any one of a number of higher speeds, to restrict automatically the driven machine to inching speed under certain conditions, to plug the motor for stopping and in some instances to mechanically brake the driven machine in addition to braking by plugging.

An object of the invention is to provide simplified and otherwise improved control means affording the aforementioned and other control functions.

Another object is to provide such control means wherein the repetition of switch operation desired for inching may be confined to a single switch.

Another object is to provide such control means with automatic means to reaccelerate the driven machine gradually following slowdown in response to abnormal conditions, assuming restoration of normal conditions while the machine continues to operate, and assuming an increase in speed to be called for by the setting of the master controller.

Another object is to minimize the number of interlocks required by control means of the aforementioned character.

Another object is to provide for reduction in size of the control panel required for such control means.

Other objects and advantages of the invention will hereinafter appear.

Certain embodiments of the invention are illustrated in the accompanying drawings which will now be described, it being understood that the embodiments illustrated are susceptible of various modifications without departing from the scope of the appended claims.

In the drawings,

Fig. 3 shows a modified form of control means for the control instrumentalities of Fig. 1.

Figure 1:
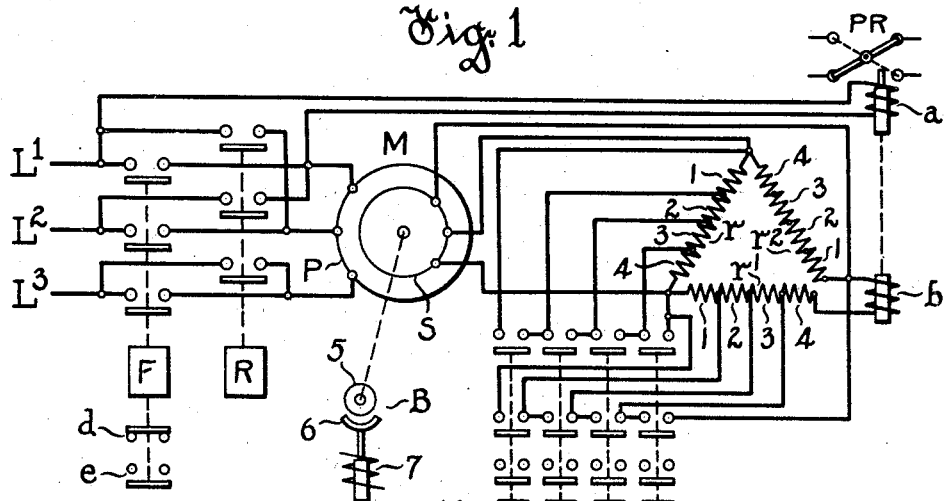
Figure 1 shows diagrammatically an alternating current slip ring motor to drive the machine to be controlled and also shows circuit connections for the motor together with certain control instrumentalities.

Referring to Fig. 1, there is shown a motor M having a 3 phase primary P and secondary S. The motor primary is supplied from lines $L^1$, $L^2$ and $L^3$ through a 3 pole electromagnetic forward switch F, or alternatively through a 3 pole electromagnetic reverse switch R. These switches control the ordinary reversing connections for the motor primary and by energization selectively afford reverse operations selectively of motor M. The speed of motor M is controlled through the medium of delta connected secondary resistors $r$, $r^1$ and $r^2$, one for each phase of the motor secondary, and each comprising four sections 1, 2, 3 and 4 under the control of accelerating switches IA, 2A, 3A and 4A. Each of these accelerating switches is of the electromagnetic type having 3 poles to short circuit the corresponding sections of resistors $r$, $r^1$ and $r^2$, and each switch is shown with connections to resistors $r$ and $r^1$, the connections to resistor $r^2$ being omitted for simplicity of illustration. As will be apparent, the uppermost contacts of switches IA, 2A, 3A and 4A, respectively, provide short circuits for the sections 1, 2, 3 and 4 of resistor $r$ and the intermediate contacts of said switches respectively provide short circuits for sections 1, 2, 3 and 4 of resistor $r^1$, whereas as will be understood the lowermost contacts of said switches would be similarly connected to resistor $r^2$ to short circuit respectively its sections 1, 2, 3 and 4. The resistors are preferably so proportioned as to afford sixteen different speeds of the motor under control of the switches IA to 4A in different groupings, and the sections 3 of said resistors are so proportioned that short-circuiting thereof will afford the motor adequate torque for starting.

As will be understood, when the motor is operating in forward direction plugging for stopping may be effected by opening switch F and closing switch R, the latter switch being reopened as the motor is brought to rest. For deenergizing switch R at the proper time there is provided a switch PR of the double throw type to be moved to its full line position by a winding $a$ opposed by a winding $b$. Winding $a$ is arranged for connection across lines $L^1$—$L^2$ by switch R while winding $b$ is subjected to the current of the motor secondary to effectively oppose operation of switch PR by winding $a$ until the motor is brought substantially to rest. Also there is shown an electro-mechanical brake B to supplement braking by plugging. This brake has a drum 5 operatively connected to the rotor of the motor, a shoe 6 normally out of engagement with said drum and an electromagnetic winding 7 adapted when energized to effect engagement of shoe 6 with drum 5.

Figure 2:
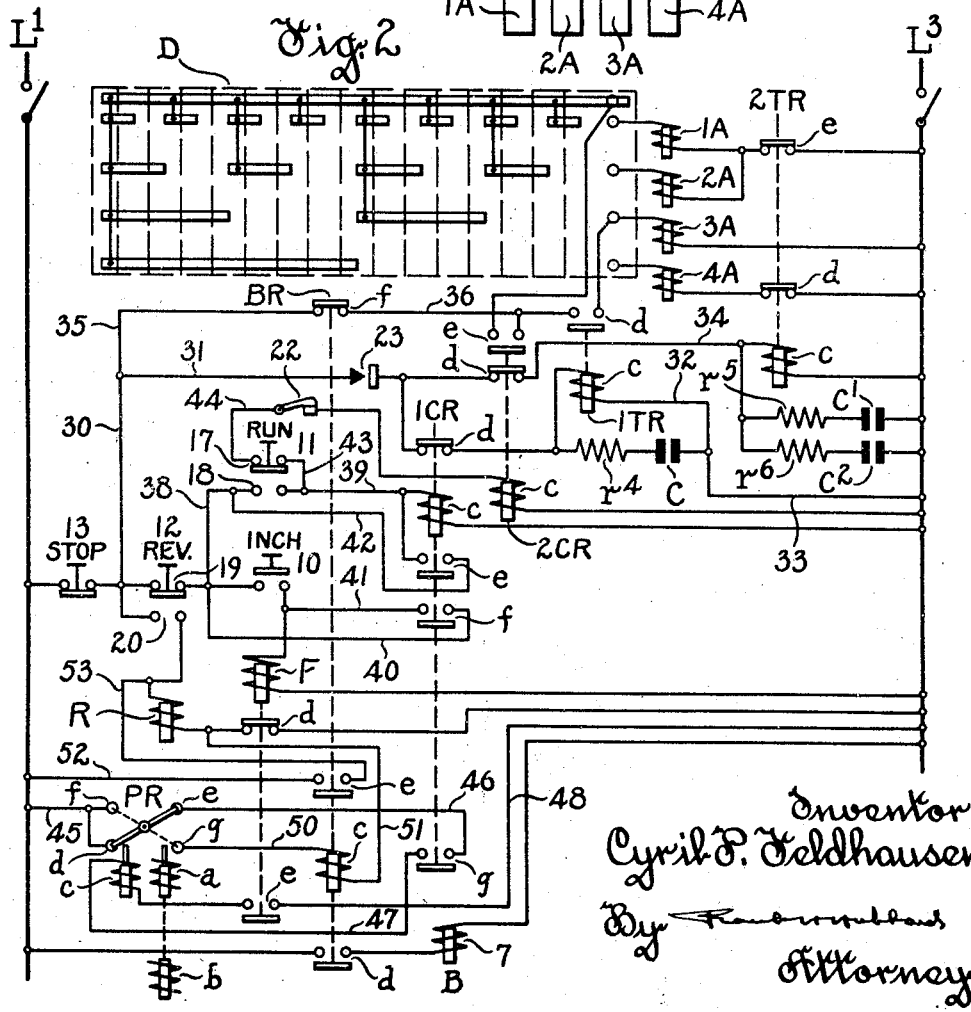
Fig. 2 shows diagrammatically one form of control means for the control instrumentalities of Fig. 1.

Referring to Fig. 2, the same shows the windings of the accelerating switches 1A to 4A, the windings of the forward and reverse switches F and R, the auxiliary contacts d and e of switch F and the winding 7 of brake B. Also Fig. 2 shows a number of electroresponsive relays through the medium of which the aforementioned windings are controlled. These relays include a relay 1TR having an operating winding c and having normally disengaged contacts d in series with the winding of accelerating switch 3A, and a relay 2TR having an operating winding c, normally engaged contacts d in series with the winding of switch 4A, and contacts e in series with the windings of switches 1A and 2A. Relays 1TR and 2TR are controlled for a time element incident to release, the relay 1TR to this end being provided with a shunt for its winding c, including a condenser C and a resistor $r^4$, while the relay 1TR has two shunt circuits for its operating winding c, one shunt including a condenser $C^1$ and a resistor $r^5$, and the other shunt including a condenser $C^2$ and a resistor $r^6$. Also the relays shown include relays 1CR, 2CR and BR. Relays 1CR and 2CR control circuits hereinafter described, the former relay having an operating winding c, normally engaged contacts d and normally disengaged contacts e, f and g, while the latter relay has an operating winding c, normally engaged contacts d and normally disengaged contacts e. The relay BR has an operating winding c, normally disengaged contacts d which control the circuit of winding 7 of the brake B, normally disengaged contacts e in a circuit hereinafter described and normally engaged contacts f in series with the contacts d of relay 1TR. Also Fig. 2 shows a resetting winding c for the aforementioned switch PR. Switch PR is shown in the position to which it is moved by the winding a at the end of each plugging cycle and the winding c when energized resets the switch PR to the position indicated by dotted lines, said switch in the full line position bridging contacts d and e and in its dotted line position bridging contacts f and g. The resetting winding c of switch PR is under the control of contacts g of relay 1CR and normally disengaged auxiliary contacts e of switch F, said switch F having additional auxiliary contacts d which are normally engaged and are in series with the winding of reverse switch R.

Fig. 2 also shows a master controller comprising push button switches 10, 11, 12 and 13 and a manual drum type switch D. Push button switch 10 controls inching and is normally open. Push button switch 11 controls running and is of the double throw type, having normally bridged contacts 17 and contacts 18 to be bridged by depression of the push button, after circuit is broken between contacts 17. Push button switch 12 controls reversal of the motor and is of a type like switch 11 having normally bridged contacts 19 and contacts 20 to be bridged upon depression of the push button, after interruption of circuit between contacts 19. Push button switch 13 controls stopping and has but a single set of contacts which are normally engaged. Drum switch D affords preselection of the accelerating switches to be energized for running. The drum has sixteen positions including the position shown, for selection of any of the aforementioned sixteen speeds, the connections therefor not being described herein as they are both obvious and well understood in the art.

Additional instrumentalities shown in Fig. 2 comprise an automatic slow down switch 22 and a rectifier 23. The switch 22 may be assumed to be of any of the well known types to trip under abnormal conditions, as when a sheet in the press is out of position, to bring about the slowdown of the machine if operating at higher than inching speed and to restrict the speed pending resettling of said switch. The rectifier 23 is provided to limit to a unidirectional flow the current supplied to the windings c of relays 1TR and 2TR because of the type of time element means associated therewith.

Considering the functions of the controller shown in Fig. 2, and assuming the parts to be in the positions shown it will be observed that upon closure of the knife switches in lines $L^1$ and $L^3$ rectified current will be supplied to the windings of relays 1TR and 2TR. More particularly current will flow from line $L^1$ through the normally closed stop push button switch 13 by conductors 30 and 31 through the rectifier 23 where it divides. One branch continues through the contacts d of relay 1CR to and through the winding c of relay 1TR by conductors 32 and 33 to line $L^3$, while the other branch continues through contacts d of relay 2CR by conductor 34 to and through the winding c of relay 2TR to line $L^3$. Thus both relays 1TR and 2TR are energized and relay 1TR in responding engages its contacts d to complete an energizing circuit for the accelerating switch 3A, whereas relay 2TR in responding disconnects through disengagement of its contacts d and e the windings of accelerating switches 1A, 2A and 4A from the line $L^3$. The energizing circuit for the winding of switch 3A may be traced from line $L^1$ to conductor 30, by conductor 35 to and through the normally engaged contacts f of brake relay BR, by conductor 36 to and through the now engaged contacts d of relay 1TR, to and through the winding of switch 3A to line $L^3$. Switch 3A being thus energized responds to short-circuit the sections 3 of the motor secondary resistance for high torque starting. However, starting is dependent upon manual operation of the inch switch, the run switch or the reverse switch.

Assuming depression of the inch switch 10, circuit is completed from line $L^1$ through the normally engaged contacts of the stop switch 13 and the reverse switch 12 to and through the now closed inch switch, to and through the winding of the forward switch F to line $L^3$. Energization of switch F, as will be apparent from Fig. 1, connects the motor primary to lines $L^1$, $L^2$ and $L^3$ for starting the motor in forward direction with the sections 3 of the secondary resistance short-circuited by switch 3A, as previously set forth. The switch F remains energized only so long as the inch button is held depressed and upon deenergization disconnects the motor from the power supply pending a further inching operation. While energized the switch F through disengagement of its contacts d interrupts the connection between the winding of reverse switch R and line $L^3$.

Assuming operation of the run switch 11, the switch F is energized but only by prior energization of relay 1CR. The energizing circuit of relay 1CR extends from line $L^1$ through the normally closed contacts of the stop switch 13 and reverse switch 12 by conductor 38 to and through the now bridged contacts 18 of switch 11 by conductor 39 to and through the winding c of relay 1CR to line $L^3$. Relay 1CR being thus energized responds and through engagement of its contacts e establishes for itself a maintaining circuit shunting the contacts 18 of switch 11. Also through engagement of its contacts f relay 1CR establishes an energizing circuit for the winding of switch F. This circuit may be traced from the normally closed contacts of reversing switch 12 by conductor 40 through the contacts f of relay 1CR by conductor 41 through the winding of switch F to line L³. Thus the motor is started as aforedescribed, but continued operation of the motor is not dependent upon manual retention of the run switch in depressed position because the relay 1CR is self-maintained. Moreover relay 1CR in responding disengages its contacts d to interrupt the energizing circuit of winding c of relay 1TR. Relay 1TR then releases, subject to the time element afforded by its shunt including resistor $r^4$ and condenser C, to disengage its contacts d, thereby to interrupt the circuit of the winding of switch 3A, causing said switch to reinsert the sections 3 of the motor secondary resistance. Then, assuming release of the run push button switch 11 for its return to normal position to bridge contacts 17, the energizing circuit for relay 2CR will be completed. This circuit extends from line L¹ through push button switches 13 and 12 by conductors 38 and 42 to and through the now engaged contacts e of relay 1CR by conductors 39 and 43 through contacts 17 of switch 11 by conductor 44 through switch 22 to and through the winding c of relay 2CR to line L³. Relay 2CR being thus energized responds to engage its contacts e and to disengage its contacts d, thereby to connect drum D to line L¹ and to interrupt the energizing circuit of winding c of relay 2TR. Relay 2TR thus releases subject to the time delay afforded by the shunt circuits of its winding c, to connect to line L³ the winding of switch 4A and also the windings of switches 1A and 2A. However, the switches 4A, 1A and 2A remain unresponsive with the drum in the position illustrated but should the drum be in position to complete circuit between the windings of these switches and line L¹ then said switches would be rendered responsive by the aforementioned release of relay 2TR. Here it is to be noted that the relay 2TR is preferably so constructed in a well known manner as to reclose its contacts d in advance of reclosure of its contacts e to render progressive response of switch 4A and response of switches 1A and 2A, assuming setting of the drum d for response of all of the same. This, as will be understood, affords more favorable conditions for acceleration of the motor and for reacceleration thereof should it be slowed down by tripping of the switch 22.

Tripping of the switch 22, as will be apparent, deenergizes relay 2CR with the result of again energizing relay 2TR. Also the relay 2CR in releasing disengages its contacts e to interrupt the feed from line L¹ to the drum D, thereby interrupting the energizing circuits of all accelerating switches, assuming positioning of the drum D tending to energize all of said switches. Then assuming the conditions causing opening of switch 22 to be remedied, and assuming switch 22 to be reset, the relay 2CR will be again energized to establish the feed of the drum D and to interrupt the energizing circuit of relay 2TR for automatic re-acceleration of the motor in a manner which will be clear from the foregoing description.

Considering now the further functioning of the controller when operated to effect running, the forward switch F and relay 1CR when energized jointly establish an energizing circuit for the winding c of the plugging control switch PR. This circuit may be traced from line L¹ by conductor 45 through the bridge contacts d and e of switch PR by conductor 46 to and through the now engaged contacts g of relay 1CR by conductor 47 to and through the winding c of switch PR to and through the now engaged contacts e of switch F by conductor 48 to line L³. Winding c of switch PR being thus energized responds to shift said switch to its dotted line position which has no immediate effect except to deenergize its said winding c, said switch remaining in its new position without dependence upon said winding. This prepares the controller for stopping operation utilizing both plugging and mechanical braking.

Such stopping of the motor is effected by depression of the stop push button 13 which deenergizes all of the aforedescribed relays and the forward switch F, whereas switch F then through engagement of its contacts d completes an energizing circuit for the winding of brake relay BR. This circuit extends from line L¹ by conductor 45 through now bridged contacts f and g of switch PR by conductor 50 to and through winding c of relay BR by conductor 51 to and through the contacts d of switch F to line L³. Relay BR being thus energized responds and through engagement of its contacts e energizes the reversing switch R, whereas through engagement of its contacts d it also energizes the winding 7 of the mechanical brake B to set said brake. As will be understood, the reversing connections for the motor which are established by energization of switch R provide for braking of the motor through plugging action, whereas such braking is supplemented by the now set mechanical brake B. The energizing circuit for the switch R extends from line L¹ by conductor 52 through the contacts e of relay BR, by conductor 53 to and through the winding of switch R to and through the contacts d of switch F to line L³, this circuit being independent of the stop switch 13, as is also obviously true of the energizing circuits for the winding 7 of the brake B and the winding of relay BR. Thus braking is not dependent upon continued depression of the push button switch 13, braking continuing until the motor secondary current decreases to permit operation of switch PR by winding a against the opposition of the current winding b. This deenergizes relay BR which upon release deenergizes switch R and the brake winding 7, leaving the motor disconnected from circuit pending restarting by the inch switch or the run switch, as aforedescribed, or by the reverse push button switch 12.

Depression of the reverse push button switch 12 opens the feed to the inch and run switches and by bridging of its down contacts 20 connects the winding of switch R to line L¹. On the other hand, the winding of switch R is connected to line L³ through the normally closed contacts d of switch F, and hence depression of push button switch 12 energizes switch R for reverse operation of the motor, but only so long as switch 12 is held depressed. As previously explained, relays 1TR and 2TR are normally energized, the former when energized effecting energization of accelerating switch 3A to short-circuit a portion of the motor primary resistance, whereas the relay 2TR when energized prevents energization of any other accelerating switch. Thus as depression of push button switch 12 has no effect upon the relays 1TR and 2TR it will be apparent that except for direction of rotation the operation of the motor upon depression of push button switch 12 will be the same as upon operation of the inch switch 10.

Referring to the modified control of Fig. 3, it eliminates one of the time element relays of Fig. 2, Fig. 3 for simplicity of illustration having omitted therefrom the aforedescribed control means for reversing the motor connections and for braking, which control means it is to be understood are equally applicable to this modified control. Much of the control shown in Fig. 3 is identical with that of Fig. 2 and like elements in the two cases have been given like reference characters. More particularly, Fig. 3 has the same control means for the motor secondary comprising switches 1A to 4A, the switch 3A to be normally energized for high torque starting. The drum for selecting the switches 1A to 4A has been omitted for simplification. Also the control shown in Fig. 3 is identical with that of Figs. 1 and 2 in respect of the forward switch F, the relays 1CR and 2CR and the push button switches 10, 12 and 13 for inching, reversing and stopping, respectively. Also Fig. 3, like Fig. 2, shows a slow-down switch 22 in series with the winding of the relay 2CR.

On the other hand, Fig. 3 has a single time element relay 3TR in lieu of the two time element relays of Fig. 2. This relay 3TR has normally engaged contacts d and e and normally disengaged contacts f. The contacts d are included in circuit between the winding of switch 4A and line L³, while the contacts e are included in circuit between the windings of switches 1A, 2A and line L³. The normally disengaged contacts f are included in a circuit hereinafter described. The winding c of relay 3TR has two shunts, each including a resistor and a condenser. A further difference between the control of Fig. 3 and that of Fig. 2 resides in the addition of a relay 3CR having normally disengaged contacts d and f and normally engaged contacts e for the control of circuits hereinafter described. Also in Fig. 3 a modified form of run push button switch 60 is employed. This switch has a pair of normally bridged contacts 61 and 62 and three contacts 63, 64 and 65 which are bridged upon depression of the push button, after interruption of the connection between contacts 61 and 62.

Considering the functioning of the controller of Fig. 3 it is the same as that of Fig. 1 in respect of inching as well as in respect of reversing and stopping, not shown. As in the control of Fig. 2, the switch 3A is normally energized to afford high torque starting, but in this instance the energizing circuit is established by the normally engaged contacts d of the relay 1CR. This circuit may be traced from line L¹ through push button switch 13, by conductors 66 and 67, through the contacts d of relay 1CR, by conductor 68 to and through the winding of switch 3A to line L³. Also the relay 3TR is normally energized, its energizing circuit extending from conductor 66 by conductor 69 to and through contacts e and d of relays 3CR and 2CR respectively, to and through the rectifier and winding of relay 3TR to line L³.

Assuming depression of the run switch 60, circuit is completed from line L¹ through push button switches 13 and 12, by conductor 70 through the now bridged contacts 63 and 65 by conductor 71 through the winding of relay 1CR, to line L³. Relay 1CR being thus energized responds and completes for itself a maintaining circuit extending from conductor 70 by conductor 72 to and through the now engaged contacts e of relay 1CR to and through the winding of said relay to line L³. Also relay 1CR upon responding engages its contacts f to complete circuit from line L¹ through the push button switches 12 and 13, by conductor 73 through said contacts f to and through the winding of forward switch F to line L³. Meanwhile the run switch 60 has completed the energizing circuit of relay 3CR, this circuit extending from the contact 64 of switch 60 by conductor 74 to and through the winding of relay 3CR to line L³. Relay 3CR being thus energized engages its contacts d and f and disengages its contacts e to deenergize relay 3TR for release subject to its time element. While relay 3TR maintains its contacts f engaged it maintains relay 3CR energized independently of the push button switch 60 by a circuit extending from conductor 67 by conductor 75 to and through contacts f of relay 3TR by conductors 76 and 77 to and through contacts d of relay 3CR to the winding of the latter relay. And while contacts f of the two relays 3CR and 3TR remain engaged they jointly shunt the contacts d of relay 1CR to maintain energized the switch 3A which the relay 1CR in responding tends to deenergize by disengaging said contacts d. Thus assuming release of switch 60, release of switch 3A is delayed to afford the motor an opportunity to start, the delay being determined by the time element of relay 3TR which upon releasing deenergizes switch 3A to afford the lowest running speed. Such slow speed will be maintained if the speed control drum not shown in Fig. 3 is set for minimum speed. If, on the other hand, the drum is set for higher running speed, release of the switch 60 will energize relay 2CR to render the drum effective for the selected speed, subject however to the delay incident to release of relay 3TR which must reengage its contacts d before switch 4A can respond, and must reengage its contacts e before either switch 1A or 2A can respond. Should the energization of relay 2CR be delayed until after release of relay 3TR and full movement thereof, then said relay 3TR will be energized and ready for another time limit cycle when relay 2CR is energized. This is due to the fact that release of relay 3TR releases relay 3CR which results in reengagement of its contacts e to reestablish the energizing circuit of relay 3TR unless relay 2CR has meanwhile responded. Thus it is possible to obtain time delay for high torque starting and acceleration on a single cycle of operation of relay 3TR, or alternatively to utilize one cycle of operation of said relay for high torque starting and a repeat cycle for acceleration.

What I claim as new and desire to secure by Letters Patent is:

1. In a controller for an electric motor, in combination, resistors for the motor circuit, electroresponsive switches for short-circuiting said resistors, control means to utilize said switches for speed control of the motor, and means for establishing starting connections for the motor and comprising means which always preparatory to motor starting renders ineffective said speed control means and independently thereof energizes certain of said switches for increased motor torque in starting.

2. In a controller for an electric motor, in combination, resistors for the motor circuit, electroresponsive switches for short-circuiting said resistors, control means to utilize said switches for speed control of the motor, and means for establishing starting connections for the motor for inching or running and comprising means which always preparatory to establishment of starting connections for inching or running renders ineffective said speed control means and independently thereof energizes certain of said switches for increased motor torque in starting and which remains set throughout a series of inching steps to function as aforestated.

3. In a controller for an electric motor, in combination, resistors for the motor circuit, electroresponsive switches for short-circuiting said resistors, control means to utilize said switches for speed control of the motor and comprising means to be set for preselection of any one of a number of motor speeds, a switch for establishing power connections for the motor for inching or running, and means which always preparatory to inching or running renders ineffective said speed control means and independently thereof energizes certain of said switches for increased motor torque in starting and which remains set throughout a series of inching steps, the motor circuit commutations required for such steps of inching only involving operation of said switch controlling the power connections for the motor.

4. In a controller for an electric motor, in combination, resistors for the motor circuit, electroresponsive switches for short-circuiting said resistors, control means to utilize said switches for speed control of the motor, means for establishing starting connections for the motor and comprising automatic means to render ineffective said speed control means and independently thereof to energize certain of said switches for increased motor torque in starting, said automatic means setting to so function while the motor is disconnected from circuit.

5. In a controller for an electric motor, in combination, resistors for the motor circuit, electroresponsive switches for short-circuiting said resistors, control means to utilize said switches for speed control of the motor, means for establishing power connections for the motor for inching and running, and automatic means which prior to establishment of power connections for the motor renders ineffective said speed control means and independently thereof energizes certain of said switches for increased motor torque in starting, said automatic means being controllable after starting of the motor to effect inclusion of all of said resistors and then render said speed control means effective.

6. In a controller for an electric motor, in combination, resistors for the motor circuit, electroresponsive switches for short-circuiting said resistors, control means to utilize said switches for speed control of the motor and comprising means to be set for preselection of any one of a number of motor speeds, means for establishing power connections for the motor for inching and running, and automatic means which for motor starting renders ineffective said speed control means and independently thereof energizes certain of said switches for increased motor torque in starting, said automatic means being controllable after starting of the motor to effect inclusion of all of said resistors and then render said speed control means effective to afford the preselected motor speed.

7. In a controller for an electric motor, in combination, resistors for the motor circuit, electroresponsive switches for short-circuiting said resistors, control means to utilize said switches for speed control of the motor and comprising means to be set for preselection of any one of a number of motor speeds, means for establishing power connections for the motor for inching and running, and automatic means which for motor starting renders ineffective said speed control means and independently thereof energizes certain of said switches for increased motor torque in starting, said automatic means being controllable after starting of the motor to effect inclusion of all of said resistors and then render said speed control means effective to afford the preselected motor speed and said automatic means comprising means to insure a given delay in its controlled action aforementioned.

8. In a motor controller, in combination, a switch to establish power connections for the motor, resistance for the motor circuit, electroresponsive control switches for said resistance, means to control said switches for speed regulation of the motor and comprising an electromagnetic relay requiring energization to enable such speed regulation, means comprising a second electromagnetic relay and serving when said second relay is deenergized to effect energization of certain of said electroresponsive switches independently of the first mentioned means, and means to effect operation of the first mentioned switch intermittently for inching operation of the motor while said two relays remain deenergized, thereby to provide increased motor torque for initiating each inching step.

9. In a motor controller, in combination, an electroresponsive switch to establish power connections for the motor, resistance for the motor circuit, electroresponsive control switches for said resistance, means to control said resistance switches for speed regulation of the motor and comprising an electromagnetic relay requiring energization to enable such speed regulation, means comprising a second electromagnetic relay and serving when said second relay is deenergized to effect energization of certain of said resistance switches independently of the first mentioned means, and means to energize the first mentioned switch intermittently for inching, or alternatively to energize and maintain energized the first mentioned switch for running, and in all cases effecting starting while both of said relays are deenergized.

10. In a motor controller, in combination, an electroresponsive switch to establish power connections for the motor, resistance for the motor circuit, electroresponsive control switches for said resistance, means to control said resistance switches for speed regulation of the motor and comprising an electromagnetic relay requiring energization to enable such speed regulation, means comprising a second electromagnetic relay and serving when said second relay is deenergized to effect energization of certain of said resistance switches independently of the first mentioned means, and means to energize the first mentioned switch intermittently for inching, or alternatively to energize and maintain energized the first mentioned switch for running, and in all cases effecting starting while both of said relays are deenergized, the last mentioned means comprising means enabling energization of said relays to restore control of said resistance to the first mentioned means for running.

11. In a motor controller, in combination, an electroresponsive switch to establish power connections for the motor, resistance for the motor circuit, electroresponsive control switches for said resistance, means to control said switches for speed regulation of the motor and comprising an electromagnetic relay requiring energization to enable such speed regulation, means comprising a second electromagnetic relay and electroresponsive time element means, and serving when said second relay is deenergized to effect energization of certain of said resistance switches independently of the first mentioned means, said two relays when energized restoring to said first mentioned means control of said resistance, subject to the time element afforded by said time element means, and means to energize the first mentioned switch for motor starting while said two relays are deenergized thereby to provide increased motor torque for starting, the last mentioned means also enabling energization of said two relays for running.

12. In a motor controller, in combination, an electroresponsive switch to establish power connections for the motor, resistance for the motor circuit, electroresponsive control switches for said resistance, means to control said switches for speed regulation of the motor and comprising an electromagnetic relay requiring energization to enable such speed regulation, means comprising a second electromagnetic relay and electroresponsive time element means and serving when said second relay is deenergized to effect energization of certain of said resistance switches independently of the first mentioned means, said two relays when energized restoring to said first mentioned means control of said resistance, subject to the time element afforded by said time element means, means to energize the first mentioned switch for motor starting while said relays are deenergized and enabling thereafter energization of both of said relays, and means effecting deenergization of both of said relays as an incident to stopping of the motor.

13. In a motor controller, in combination, a switch to establish power connections for the motor, a plurality of resistance sections for the motor, electroresponsive switches responsive to short-circuit different sections of said resistance, means to control said resistance switches for speed regulation of the motor and comprising means affording preselection of any of a number of speeds, automatic means to render the aforementioned control ineffective and independently thereof to energize certain of said electroresponsive switches for increased motor torque for motor starting by the first mentioned switch, means subjecting said automatic means to manual control to restore to the first mentioned means control of said resistance, said automatic means including time element means to delay response of certain of said resistance switches when restored to control by said first mentioned means.

14. In a controller for an electric motor, in combination, means to start the motor for inching at slow speed, or alternatively to start and accelerate the motor for running, said means providing for high torque starting of the motor in either case, and braking means for the motor associated with the former means to be effective upon disconnection of the motor following its connection for running, but ineffective upon disconnection of the motor in inching, said breaking means comprising means to establish plugging connections for the motor subject to interruption thereof automatically upon arrest of the motor, and further comprising an electromechanical brake which is normally released and which is set as an incident to establishment of plugging connections and again released as an incident to interruption of said connections.

15. In a controller for an electric motor, in combination, means to establish power connections for the motor for reverse operations thereof selectively and to reverse the power connections for plugging of the motor to stop the same, a normally released electromechanical brake, means to control jointly the former means and said brake to effect establishment of plugging connections and setting of said brake and automatically to effect thereafter interruption of said plugging connections and release of said brake, and means to control the first mentioned means to effect inching of the motor or running of the motor, and also to control the second mentioned means to initiate braking of the motor.

16. In a controller for an electric motor, in combination, means to establish power connections for the motor for reverse operations thereof selectively and to reverse the power connections for plugging of the motor to stop the same, a normally released electromechanical brake, means to control jointly the former means and said brake to effect establishment of plugging connections and setting of said brake and automatically to effect thereafter interruption of said plugging connections and release of said brake, and means to control the first mentioned means to effect inching of the motor or running of the motor and also to control the second mentioned means to initiate braking of the motor but only for stopping after running as distinguished from inching.

CYRIL P. FELDHAUSEN.